(No Model.)

C. PATTENGER.
FRUIT DRIER.

No. 365,319.  Patented June 21, 1887.

Attest
W. J. Christopher
O. M. Hill

Inventor
Cyrus Pattenger
her Wm. Hubbell Fisher
Atty.

UNITED STATES PATENT OFFICE.

CYRUS PATTENGER, OF CINCINNATI, OHIO, ASSIGNOR OF ONE-HALF TO JOHN H. DAVIS, OF SAME PLACE.

FRUIT-DRIER.

SPECIFICATION forming part of Letters Patent No. 365,319, dated June 21, 1887.

Application filed July 12, 1886. Serial No. 207,763. (No model.)

*To all whom it may concern:*

Be it known that I, CYRUS PATTENGER, a resident of Cincinnati, Hamilton county, Ohio, have invented certain new and useful Improvements in Steam Fruit and Vegetable Evaporators, of which the following is a specification.

The object of my invention and the advantages arising from its use will be apparent from the following description.

Figure 1:
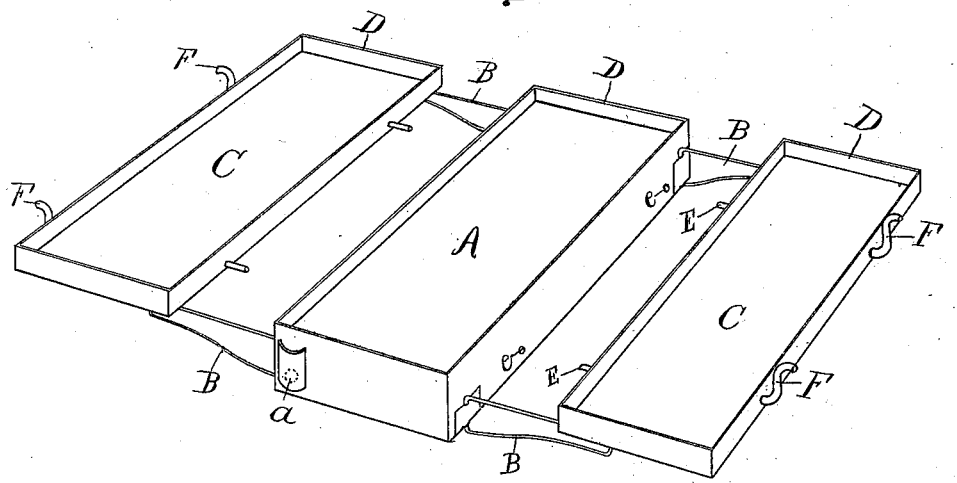
Figure 3:
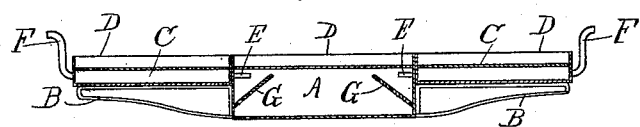
Figure 2:
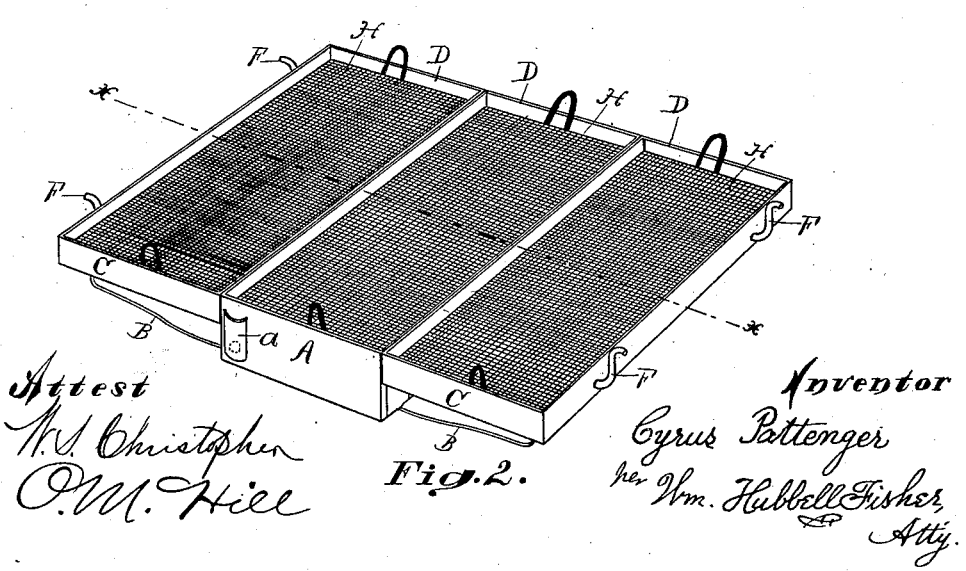

In the accompanying drawings, forming part of this specification, Figure 1 is a perspective view of the steam-generator and the side pans, the pans being removed a short distance from the generator in order to show the manner of connection therewith. Fig. 2 is a perspective view, same as Fig. 1, with the side pans in position for operation. Fig. 3 is a section taken through the steam-generator and side pans, taken at the line $x\ x$, Fig. 2, the pans being placed in an operative position.

My drier is of the portable kind, and is adapted to be used in connection with an ordinary stove or range.

A represents the preferable form of steam-generator, which may be made of any suitable material, as tin, zinc, copper, or galvanized iron, the latter being preferable. This generator, as shown, is in the form of a rectangular vessel, closed on all of its sides, into which water is introduced through an opening, as $a$. The brackets B, on which the side pans, C, rest and slide, are preferably hinged to the side of the generator A, but may be hinged to the ends thereof, and are adapted to fold against the sides or ends of said generator when not in use. The pans C are preferably of the same configuration as the generator A, but not so deep.

The generator A and pans C are provided with the flanges D, extending around the outer edge of the upper surface of the same. The pans C are provided with inlet-pipes E, for conveying the steam from the generator A, and outlet-pipes F, for conveying the steam from the pans C. The pipes E and F are fastened to the pans C in any suitable manner, preferably by soldering thereto. The inlet-pipes E are placed in such positions as to fit the openings $e$ in the side of the steam generator when placed in position for operation.

On the inside of the steam-generator A are secured flanges G, which preferably extend the length of said generator on either side. These flanges are secured to the inner side of the generator at or near the bottom of the same and extend upward at an angle to almost the top of the generator, as shown in Fig. 3. The object of these flanges G is to prevent any water, when agitated by boiling, from entering the inlet-pipes E and pans C. Any small amount of water that may accumulate in the pans is run back into the generator through the pipes E. The tops of the generator and pans are preferably provided with separable top coverings or trays, H, having handles $h$, made of suitable material, as wire-gauze, fluting, &c., to prevent bruising the fruit and to provide for ventilation.

If desired, additional pans may be attached to the ends of the steam-generator in the same manner as the side pans. In such case additional flanges G may be placed across the inner ends of the generator.

I am aware that fruit-driers provided with a steam-generator and side pans are not new; but

What I claim as new and of my invention, and desire to secure by Letters Patent, is—

1. In a fruit and vegetable drier, the steam-generator A, having angularly-inclined flanges G and side pans, C, and means, substantially as described, for communicating steam from the generator to the pans.

2. The combination of steam-generator A, having angularly-inclined flanges G, pans C, separable trays H, inlet-pipes E, and outlet-pipes F, substantially as set forth.

CYRUS PATTENGER.

Witnesses:
O. M. HILL,
W. P. GULICK.

Correction in Letters Patent No. 365,319.

It is hereby certified that the name of the patentee in Letters Patent No. 365,319, granted June 21, 1887, for an improvement in "Fruit Driers," was erroneously written and printed "Cyrus Pattenger," whereas said name should have been written and printed *Cyrus Pottenger;* and that the said Letters Patent should be read with this correction therein that the same may conform to the record of the case in the Patent Office.

Signed, countersigned, and sealed this 12th day of July, A. D. 1887.

[SEAL.]

D. L. HAWKINS,
*Acting Secretary of the Interior.*

Countersigned:
BENTON J. HALL,
*Commissioner of Patents.*